United States Patent [19]

Bellet et al.

[11] Patent Number: 4,708,839
[45] Date of Patent: Nov. 24, 1987

[54] METHOD OF COMPRESSIVELY MOLDING ARTICLES FROM RESIN COATED FILLER MATERIALS

[75] Inventors: Richard J. Bellet, Boonton Township, Morris County; Ephraim Broyer, Murray Hill; Alex Y. Bekker, Hackensack, all of N.J.; Melvin A. Lace, Prospect Heights, Ill.

[73] Assignee: Amphenol Corporation, Wallingford, Conn.

[21] Appl. No.: 814,845

[22] Filed: Dec. 30, 1985

[51] Int. Cl.⁴ .................. B29C 43/00; B29C 67/16
[52] U.S. Cl. .............................. 264/85; 264/110; 264/125; 264/126
[58] Field of Search ............ 427/221; 264/110, 109, 264/123, 68, 85, 126, 7, 125, 131

[56] References Cited

U.S. PATENT DOCUMENTS

| | | | |
|---|---|---|---|
| 3,799,799 | 3/1974 | Woodhams et al. | 264/110 |
| 4,065,519 | 12/1977 | Koch | 264/126 |
| 4,466,853 | 8/1984 | Hartmann et al. | 156/381 |

OTHER PUBLICATIONS

*Modern Plastics Encyclopedia*, 1984–85, pp. 138–140.

*Primary Examiner*—Jan H. Silbaugh
*Assistant Examiner*—J. F. Durkin, II
*Attorney, Agent, or Firm*—Bacon and Thomas

[57] ABSTRACT

A powder for use in compressing molding is made by coating a high amount of filler by weight, for example calcium metasilicate with a thermoplastic resin, for example, nylon. The amount of filler to nylon is typically above 60% to 98% by weight of the powder. The resultant powder is employed in a compressive molding process in a metallurgy press to manufacture an article which is structurally stable, and which is later solidified and strength increased by crystallizing the nylon or resin in an oven raised to the crystallization temperature of the resin to result in a compressively molded article having high strength characteristics and requiring a small amount of resin as compared to conventional molding processes.

11 Claims, 1 Drawing Figure

METHOD OF COMPRESSIVELY MOLDING ARTICLES FROM RESIN COATED FILLER MATERIALS

DESCRIPTION

Background of the Invention

This invention relates to resin compositions having high percentages of fillers and the methods of making the composition. In addition, in another aspect the invention relates to the method of employing the compositions in a compressive molding process to manufacture articles and the articles themselves as manufactured by the compressive molding process.

Compression molding is one of the oldest production techniques in the plastics industry. Typically it consists of placing a charge of granular powder or a consolidated, preheated, preform into an open mold cavity and compressing the compound within the mold. With the application of heat and pressure, the plastic flows and fills the cavity, and after curing or solidification, an article is manufactured. Typically, the compositions employed in such compressive molding techniques include a high percentage of resin, be it thermoplastic or thermosetting, typically on the order of 50% to 70% by weight, with the remainder being a reinforcing filler. To effect the compression, high pressures are required, typically on the order of 5-10 tons per square inch or more and heating is required within the press for a cycle time of many minutes to cause the resin to melt within the mold, all of which contribute to delays in the process, premature wear of the molding apparatus, and high cost due to the high percentage of resin required for the composition to manufacture the articles. For a general discussion of such compression molding techniques as performed in the prior art reference is made to the *Modern Plastics Encyclopedia*, 1980, Pgs. 253–256, the article by Rick Paci on compression molding, which disclosure is specifically incorporated by reference herein. Accordingly, it is impossible to employ high amounts of filler within such a process since there is the requirement that the resin melt and flow. If insufficient resin is used then although melting will occur, there will be regions left devoid of resin and thus, a part having weakened regions will be the result.

U.S. Pat. No. 2,849,414 to Stott teaches an alternative method of manufacturing articles wherein relatively high percentages of filler are employed. Typically, Stott teaches employing carbon black in a predetermined particulate form of a size greater than 40μ and in amounts of 5% to 85% by weight, preferably 20% to 70% by weight. Nylon is precipitated with the carbon black to result in a mixture of discretely precipitated nylon particles, uncoated carbon black particles and only partially coated carbon black particles. Thereafter, the article is manufactured by compression molding with pressures of 10 to 50 tons, typically 25 tons. The article is then removed from the mold and heated in an oven to crystallize the nylon and thereby cure the article. It is specifically discussed in Stott that lower pressures will not suffice, for example, it is indicated that 3 tons will be insufficient to make the initial preform of the article since the article must then be handled with care and is easily destroyed upon manipulation.

U.S. Pat. No. 2,975,128 to Stott teaches a further development in this art whereby the requirement for simultaneous compressing and heating is also eliminated. In this patent is is disclosed that polytetrafluoroethylene as a filler can be employed in amounts of 10% to 75% by weight, preferably 20% to 30% by weight, and it being specifically indicated that amounts above 85% are not desireable. This is typically practiced with nylon as a resin precipitated with the polytetrafluoroethylene particles (hereinafter PTFE) to result in a mixture similar to that of the above-discussed Stott patent. If a softer polymer than nylon is employed, the amounts of filler typically only range between 2% to 15% by weight and preferably 3% to 10% by weight. In any event, as in the first above-discussed Stott patent, the pressures required are typically 25 to 50 tons per square inch with pressures below 10 tons per square inch being insufficient, for example, 3 tons, as above, yielding a briquette which is easily destroyed upon initial handling prior to heating and thus, complicates the transfer from the mold to an oven.

In a further development as disclosed in U.S. Pat. No. 4,349,421, Khattab returns to the concept of compressing and heating in a chamber a composition of pigments and resin. It should be noted that the term "pigments" is used interchangeably with "filler" and recognized in the prior art as a "pigment" only to provide a specific coloration to the final article while at the same time functioning to add a structural aspect to it. Khattab teaches returning to the concept of compressing and heating in the molding chamber and employs typically 60% to 40% polyamide resin with the remainder being 40% to 60% PTFE and 2% to 11% inert filler such as silica or magnesium oxide.

In all the prior art methods disadvantages are encountered in that either the amounts of resin employed are relatively high and the compression molding process delayed due to the requirement of performing heating within the mold cavity prior to removal of the article and simultaneous with the compression or alternatively, even when it is possible to reduce the amount of resin, which is typically an expensive material, and effect the heating outside the mold, excessive pressures are still required which are damaging and reduce the overall life of the machinery employed, and the amounts of resins employed are still substantially high and thus do not provide as significant a cost savings as would be possible with even higher amounts of filler.

SUMMARY OF THE INVENTION

It is thus an object of the present invention to provide an improved method for compressively molding articles which employs a high percentage of filler material with relatively low percentages of resin.

Another object of the present invention is to provide such a compressive molding process which employs relatively low pressures in making a compressively molded preform prior to heating of the preform after removal from a mold.

It is yet still another object of the present invention to provide a method of making a compressive molding composition having very high amounts of filler with relatively low amounts of resin which can be employed in a compressive molding process with low pressures, but at a relatively high rate of compression to provide a structurally stable preform which can then be hardened later by heating in an oven.

Yet still another object of the present invention is to provide the compositions and the articles as manufactured by the above methods.

These and other objects will become more readily apparent from the following summary of the invention, detailed discussion and claims as set forth below.

In one aspect the invention relates to an improvement in a method of compressively molding articles comprising the steps of compressing a predetermined amount of moldable composition comprised of resin and filler materials in a mold cavity. "Compressive" molding is to be distinguished from "compression" in that in "compression" simultaneous heating is required. Typically the improvement is to the process which in the prior art required application of both heat and pressure to cure and/or solidify the composition to the shape of the mold cavity. The improvement resides in that the composition comprises filler material in the form of a powder having plastic resin precipitated in a manner such that is coats the surfaces of the filler material powder particles substantially uniformly throughout. Hereinafter particles shall refer to both granular as well as fibrous or like small discrete entities. The filler material comprises at least about 60% and up to about 98% by weight of the composition, and the process includes applying pressure at room temperature, as distinguished from conventional prior art compression molding techniques, to the composition in the mold cavity. The pressure is sufficient to reduce the composition powder volume resulting in a part conforming to the mold cavity. Thereafter, the part is removed from the mold and heated to a temperature about or slightly below the maximum crystallization temperature of the plastic resin, as indicated in the Differential Scanning Calorimeter scale, (hereinafter DSC), for a time sufficient to crystallize the plastic resin. Thereafter, the resultant part is allowed to cool to result in a compressively molded part having a substantially high proportion of reinforcing filler whereby the amount of plastic resin required to mold such a part is substantially reduced as compared to prior art processes.

More specifically, in the compressive molding technique in accordance with the invention, the filler provides sites for nucleation of the resin to be induced. This is done by causing compression to occur at a sufficiently high rate to cause an adiabatic temperature increase in the composition to cause initial radial growth of the resin crystal. This results in an initial article preform which is then hardened in a separate oven after removal from the mold. Further, the rate of compression is, as discussed, typically very high, on the order of 1-2 seconds in a snap-like compression action to result in the internal adiabatic heating of the composition.

In another aspect the invention relates to a method of making the compositions for use in the above-discussed molding process. The method comprises the steps of, in a vessel heated at a temperature sufficient to cause dissolution of a predetermined resin in a solvent, dissolving a predetermined resin comprising one of a thermoplastic and a thermosetting resin dissolvable in a solvent in the vessel, to cause the resin to be substantially completely dissolved therein. A charge of an inorganic or organic filler in particulate or powder form is added to the solution. Thereafter, the solution or mixture is caused to cool to cause the resin to precipitate and coat the filler particles substantially uniformly throughout the surface thereof. Thereafter, the coated particles are dryed. In the method, the resin and filler are added in amounts such that the proportion of filler by weight is about 60% to 98% of the resultant coated particles.

In yet still other aspects, the invention relates to both the compositions and the articles as manufactured by the above-discussed methods.

Having briefly discussed the invention, the details thereof will be more readily apparent from the following detailed discussion of the invention, made with reference to the FIGURE, appended examples, tables and claims.

BRIEF DESCRIPTION OF THE DRAWINGS

The drawing is a photomicrograph of a wollastonite particle, at 1500 magnification, made according to Example I.

DETAILED DISCUSSION OF THE INVENTION

The term "resins" is used in the specification and claims as a generic term for both thermosetting as well as thermoplastic resins, including any resin that can be coated onto a part and which is crystalline or assumes a crystalline structure upon polymerization thereof. It does not include what are typically referred to as "amorphous" resins which do not crystallize upon polymerization. Included among the resins contemplated, for example, are polyamides including those prepared by the polymerization of lactams, preferably epsilon-caprolactam (nylon 6), those prepared by the condensation of a diamine with a dibasic acid, preferably the condensation of hexamethylenediamine with adipic acid (nylon 6,6), those prepared by self-condensation of amino acids, preferably self-condensation of 11-amino-undecanoic acid (nylon 11), and dodecanoic acid (nylon 12). Also included are polyethylene terephthalate as well as polypheniline sulfide type resins such as that sold by Phillips Chemical Corporation, a subsidiary of Phillips Petroleum, under the trade name Ryton. An additional resin considered effective for the practice of the invention is polypropylene. Although the above-discussed resins are typically thermoplastic type resins, the invention is not limited to thermoplastic resins and also contemplates the use of thermosetting resins as will be readily apparent to those of ordinary skill in the art. Thermosetts contemplated include those that do not evolve volatile components upon polymerization. Included among these are, for example, some polyamides, i.e., those that don't evolve water. In fact, they are solid form prepolymers, i.e., B-stage resins, not liquid monomers but not yet fully cured. The only requirement for the selection of the resins is merely that they have to have the properties described hereinafter for use in the compressive molding process in accordance with the invention.

With respect to the term "fillers" this is intended to mean the base or reinforcing material which is coated with the above-discussed resins as employed in accordance with the invention. These fillers are generally referred to as particulate in nature and will include granular as well as fibrous, typically chopped fibers. The fillers include calcium metasilicate (wollastonite), available from Nyco Corporation as Nyad-G, i.e., wollastonite having been treated with alkoxysilane to achieve aminofunctional surface modification, as well as fiberglass, mica and other mineral fillers. In addition, organic materials such as polytetrafluoroethylene, i.e., PTFE, as well as fibrous polymers such as nylon fibers themselves can be employed as filler material. The main requirement when using fibrous polymers is that the $T_m$, i.e., the melting temperature of the filler polymer, must be above that of the crystallization temperature of the resins employed to coat the filler. Other filler materials which can be employed include milled glass and others as will be readily apparent to those of ordinary skill in the art.

Typically, the composition in accordance with the invention will be a powder or particulate material of the above-discussed fillers coated substantially uniformly about the surface of each particle with one of the resins discussed. In the most preferred aspect, the percentage of filler by weight as compared to the resin will comprise at least about 60% and up to about 98% and preferably 85%-98%, most preferably about 90%-98%.

In one preferred aspect, the composition will be a filler of calcium metasilicate coated with Nylon 6. In yet still another preferred aspect, the filler will be either fiberglass or mica also coated with Nylon 6. Alternatively, the composition will be polyethylene terephthalate coated on calcium metasilicate or on a filler of fiberglass. Still further, the filler can also preferably be fibers of polytetrafluoroethylene coated with Nylon 6 or polyethylene coated on fibers of Nylon 6, but in this case the polyethylene fibers are such that the $T_m$, i.e. glass transition temperature of the Nylon 6 is above that of the crystallization temperature of the polyethylene resin.

In its broadest aspect, the molding powder is made by dissolving the resin in a solvent in which the resin is dissolvable and which has been heated. Filler, which is not dissolvable in the solvent, is then added and agitated to form a slurry and the mixture is cooled to cause precipitation of the resin in a manner such that it coats the filler particles in a substantially uniform manner about the surface thereof. The particles then are filtered and washed with a washing agent such as, for example, acetone. The powder is then dried under vacuum for a sufficient period of time, typically about twelve hours. The amounts of materials added are such that the percentage of filler by weight is typically above 60%, preferably above 75% more preferably between 85% and 98% and most preferably about 90-98% by weight.

In order to manufacture articles with the composition, typically a powder metallurgy press of conventional construction is employed. The actual manufacturing by compressive molding of the articles then involves placing a known quantity of the composition powder into a mold. The part is typically compressed to provide a large reduction in powder volume and resulting in a part conforming to mold dimensions. Pressing pressure is typically on the order of about 5 tons or less per square inch.

Following the pressing operation, the material can then be handled and is of sufficient strength to not fall apart. Following the compressive molding, the parts are inspected, weighed and/or any other necessary operation depending on end use performed. Thereafter, the parts are placed in an oven at which time they are brought to a temperature approximately equal to the crystallization temperature of the particular resin involved. For example, in the case of Nylon 6 coating wollastonite i.e., calcium metasilicate, a temperature of approximately 340°-350° F. is employed and the part, after having been heated to an essentially uniform temperature throughout, is treated at that temperature for about fifteen minutes to one half hour. As will be readily apparent to those of ordinary skill in the art, the size of the part molded will affect the total time of heating. The heating is preferably done in an inert atmosphere, typically nitrogen, although other inert atmospheres such as Argon and the like can be employed. This is done primarily to prevent any type of oxidation and the use of an oxidizing atmosphere does not necessarily detrimentally affect the structural features of the part. Instead, an oxidizing atmosphere is avoided primarily to preserve color, confirming the previous discussion that the term "fillers" can be used interchangeably with the term "pigments". As such, it is also clear that other specific materials such as barium titanate, carbonaceous fillers such as carbon black, graphite, etc., may be employed as filler to obtain other types of desired characteristics for the molded article. For instance, some of these materials will provide a high dielectric constant.

The resultant article is manufactured very rapidly within the mold to form the initial article with the only remaining step being the heating in the oven to harden and solidify the article. It is contemplated that articles manufactured by this process will include such things as chip carriers, conductive boards including conductive paths therein as well as molded connector parts. Nonetheless, in order to explain the invention more clearly, the following examples are given.

EXAMPLE 1

A vessel equipped with a mechanical stirrer was charged at atmospheric pressure and room temperature with 1200 cc of ethylene glycol. The temperature of the vessel was raised to 155° C. At this temperature 97.5 grams of Nylon 6 was charged into the vessel while thoroughly stirring the solution. When the polymer was completely dissolved, 227.5 grams of high aspect ratio grade (20:1) wollastonite with aminofunctional surface modification, i.e., treated with alkoxysilane, was charged into the vessel while continuing stirring. To reduce degradation of the Nylon 6, heating was terminated upon dissolution of all the polymer. The processing was performed under a nitrogen atmosphere. Thereafter, the vessel was cooled and the nylon precipitated and coated the wollastonite particles in a substantially uniform manner throughout the surface thereof. The material was washed with acetone and filtered and the solvent was dried off the material by vacuum drying at 80° C. The drying occurred for about twelve hours. The weight of the material after evaporation was checked against combined weight of wollastonite and nylon and it was determined that the resultant powder contained about 70% by weight wollastonite. The resultant coated wollastonite is shown on the attached drawing.

EXAMPLE 2

A vessel equipped with a mechanical stirrer was charged at atmospheric pressure and room temperature with 1200 cc of ethylene glycol. The temperature of the vessel was raised to 155° C. At this temperature 130 grams of Nylon 6 was charged into the vessel while thoroughly stirring the solution. When the polymer was completely dissolved, 195 grams of high aspect ratio grade (20:1) wollastonite with aminofunctional surface modification, i.e., treated with alkoxysilane, was charged into the vessel while continuing stirring. To reduce degradation of the Nylon 6, heating was terminated upon dissolution of all the polymer. The processing was performed under a nitrogen atmosphere. Thereafter, the vessel was cooled and the nylon precipitated and coated the wollastonite particles in a substantially uniform manner throughout the surface thereof. The material was washed with acetone and filtered and the solvent was dried off the material by vacuum drying at 80° C. The drying occurred for twelve hours. The weight of the material after evaporation was checked against combined weight of wollastonite and nylon and it was determined that the resultant powder contained about 60% by weight wollastonite.

EXAMPLE 3

A vessel equipped with a mechanical stirrer was charged at atmospheric pressure and room temperature with 1000 cc of ethylene glycol. The temperature of the vessel was raised to 155° C. At this temperature 65 grams of Nylon 6 was charged into the vessel while thoroughly stirring the solution. When the polymer was completely dissolved, 260 grams of high aspect ratio grade (20:1) wollastonite with aminofunctional surface modification, i.e. treated with alkoxysilane, was charged into the vessel while continuing stirring. To reduce degradation of the Nylon 6, heating was terminated upon dissolution of all the polymer. The processing was performed under a nitrogen atmosphere. Thereafter the vessel was cooled and the nylon precipitated and coated the wollastonite particles in a substantially uniform manner throughout the surface thereof. The material was washed with acetone and filtered and the solvent was dried off the material by vacuum drying at 80° C. The drying occurred for about twelve hours. The weight of the material after evaporation was checked against combined weight of wollastonite and nylon and it was determined that the resultant powder contained 80% by weight wollastonite.

EXAMPLE 4

A vessel equipped with a mechanical stirrer was charged at atmospheric pressure and room temperature with 1000 cc of benzyl alcohol. The temperature of the vessel was raised to 160° C. At this temperature 40 grams of polyethyelene terephthalate in pelletized form, (hereinafter PET), was charged into the vessel while thoroughly stirring the solution. When the polymer was completely dissolved, 160 grams of high aspect ratio grade (20:1) wollastonite with aminofunctional surface modification, i.e., treated with alkoxysilane, was charged into the vessel while continuing stirring. To reduce degradation of the PET, heating was terminated upon dissolution of all the polymer. The processing was performed under a nitrogen atmosphere. Thereafter, the vessel was cooled and the PET precipitated and coated the wollastonite particles in a substantially uniform manner throughout the surface thereof. The material was washed with acetone and filtered and the solvent was dried off the material by vacuum drying at 80° C. The drying occurred for about 12 hours. The weight of the material after evaporation was checked against combined weight of wollastonite and PET and it was determined that the resultant powder contained about 80% by weight wollastonite.

EXAMPLE 5

A vessel equipped with a mechanical stirrer was charged at atmospheric pressure and room temperature with 1000 cc of benzyl alcohol. The temperature of the vessel was raised to 160° C. At this temperature 40 grams of PET in pelletized form was charged into the vessel while thoroughly stirring the solution. When the polymer was completely dissolved, 160 grams of 400 mesh or finer solid glass spheres, said glass spheres having been organo-functionally surface modified in a conventional manner and commerically readily available, was charged into the vessel while continuing stirring. To reduce degradation of the PET, heating was terminated upon dissolution of all the polymer. The processing was performed under a nitrogen atmosphere. Thereafter, the vessel was cooled and the PET precipitated and coated the glass spheres in a substantially uniform manner throughout the surface thereof. The material was washed with acetone and filtered and the solvent was dried off the material by vacuum drying at 80° C. The drying occurred for about twelve hours. The weight of the material after evaporation was checked against combined weight of glass and PET and it was determined that the resultant composition contained about 80% by weight glass spheres.

EXAMPLE 6

A vessel equipped with a mechanical stirrer was charged at atmospheric pressure and room temperature with 1000 cc of dimethylformamide. The temperature of the vessel was raised to 140° C. At this temperature 40 grams of nylon, i.e., Nylon 11, presently available commercially from Pilsan Corporation, was charged into the vessel while thoroughly stirring the solution. When the polymer was completely dissolved, 160 grams of high aspect ratio grade (20:1) wollastonite with aminofunctional surface modification, i.e., treated with alkoxysilane, was charged into the vessel while continuing stirring. To reduce degradation of the Nylon 11, heating was terminated upon dissolution of all the polymer. The processing was performed under a nitrogen atmosphere. Thereafter, the vessel was cooled and the nylon precipitated and coated the wollastonite particles in a substantially uniform manner throughout the surface thereof. The material was washed with acetone and filtered and the solvent was dried off the material by vacuum drying at 80° C. The drying occurred for about twelve hours. The weight of the material after evaporation was checked against combined weight of wollastonite and nylon and it was determined that the resultant powder contained about 80% by weight wollastonite.

EXAMPLE 7

A vessel equipped with a mechanical stirrer was charged at atmospheric pressure and room temperature with 1000 cc of dimethylformamide. the temperature of the vessel was raised to 140° C. At this temperature 40 grams of Nylon 11 was charged into the vessel while thoroughly stirring the solution. When the polymer was completely dissolved, 160 grams of 400 mesh or finer solid glass spheres, like those of Example 5, was charged into the vessel while continuing stirring. To reduce degradation of the Nylon 11, heating was terminated upon dissolution of all the polymer. The process was performed under a nitrogen atmosphere. Thereafter, the vessel was cooled and the nylon precipitated and coated the glass spheres in a substantially uniform manner throughout the surface thereof. The material was washed with acetone and filtered and the solvent was dried off the material by vacuum drying at 80° C. The drying occurred for about twelve hours. The weight of the material after evaporation was checked against combined weight of glass spheres and nylon and it was determined that the resultant material contained about 80% by weight glass spheres.

EXAMPLE 8

A vessel equipped with a mechanical stirrer was charged at atmospheric pressure and room temperature with 1000 cc of ethylene glycol. The temperature of the vessel was raised to 155° C. At this temperature 60 grams of Nylon 6 was charged into the vessel while thoroughly stirring the solution. When the polymer was completely dissolved, 140 grams of mica particles, i.e., Bendica Mica 101 as available commercially from Porter Industries in a form wherein the mica particles are organofunctionally surface modified in a conventional manner, was charged into the vessel while continuing stirring. To reduce degradation of the Nylon 6, heating was terminated upon dissolution of all the polymer. The processing was performed under a nitrogen atmosphere. Thereafter, the vessel was cooled and the nylon precipitated and coated the mica particles in a substantially uniform manner throughout the surface thereof. The material was washed with acetone and filtered and the solvent was dried off the material by vacuum drying at 80° C. The drying occurred for about twelve hours. The weight of the material after evaporation was checked against combined weight of mica and nylon and it was determined that the resultant composition contained about 70% mica.

EXAMPLE 9

A vessel equipped with a mechanical stirrer was charged at atmospheric pressure and room temperature with 300 cc of ethylene glycol. The temperature of the vessel was raised to 155° C. At this temperature, 20 grams of Nylon 6 was charged into the vessel while thoroughly stirring the solution. When the polymer was completely dissolved, 80 grams of 1/32" fiberglass, as commercially available from PPG Corporation, in a form wherein it has been organofunctionally surface modified in a conventional manner, was charged into the vessel while continuing stirring. To reduce degradation of the Nylon 6, heating was terminated upon dissolution of all the polymer. The processing was performed under a nitrogen atmosphere. Thereafter, the vessel was cooled and the nylon precipitated and coated the fiberglass fibers in a substantially uniform manner throughout the surface thereof. The material was washed with acetone and filtered and the solvent was dried off the material by vacuum drying at 80° C. The drying occurred for about twelve hours. The weight of the material after evaporation was checked against combined weight of wollastonite and nylon and it was determined that the resultant composition contained about 80% by weight fiberglass.

EXAMPLE 10

A vessel equipped with a mechanical stirrer was charged at atmospheric pressure and room temperature with 300 cc of ethylene glycol. The temperature of the vessel was raised to 155° C. At this temperature 20 grams of Nylon 6 was charged into the vessel while thoroughly stirring the solution. When the polymer was completely dissolved, 80 grams of 1/16" length fiberglass, as commercially available from PPG Corporation, in organofunctional surface modified form as in Example 9, was charged into the vessel while continuing stirring. To reduce degradation of the Nylon 6, heating was terminated upon dissolution of all the polymer. The processing was performed under a nitrogen atmosphere. Thereafter the vessel was cooled and the nylon precipitated and coated the fiberglass fibers in a substantially uniform manner throughout the surface thereof. The material was washed with acetone and filtered and the solvent was dried off the material by vacuum drying at 80° C. The drying occurred for about twelve hours. The weight of the composition after evaporation was checked against combined weight of fiberglass and nylon and it was determined that the resultant composition contained about 80% by weight fiberglass.

EXAMPLE 11

A vessel equipped with a mechanical stirrer was charged at atmospheric pressure and room temperature with 800 cc of ethylene glycol. The temperature of the vessel was raised to 155° C. At this temperature 80 grams of Nylon 6 was charged into the vessel while thoroughly stirring the solution. When the polymer was completely dissolved, 120 grams of ⅛" length fiberglass fiber, as commercially available from PPG Corporation, in organofunctional surface modified form as in Examples 9 and 10, was charged into the vessel while continuing stirring to reduce degradation of the Nylon 6, heating was terminated upon dissolution of all the polymer. The processing was performed under a nitrogen atmosphere. Thereafter, the vessel was cooled and the nylon precipitated and coated the fiberglass fibers in a substantially uniform manner throughout the surface thereof. The material was washed with acetone and filtered and the solvent was dried off the material by vacuum drying at 80° C. The drying occurred for about twelve hours. The weight of the material after evaporation was checked against combined weight of nylon and fiberglass and it was determined that the resultant composition contained about 60% by weight fiberglass.

EXAMPLE 12

A vessel equipped with a mechanical stirrer was charged at atmospheric pressure and room temperature with 500 cc of phenyl ether. The temperature of the vessel was raised to 225° C. At this temperature 20 grams of polyphenylsulfide (Ryton) was charged into the vessel while thoroughly stirring the solution. When the polymer was completely dissolved, 80 grams of high aspect ratio grade (20:1) wollastonite with aminofunctional surface modification, i.e., treated with alkoxysilane, was charged into the vessel while continuing stirring. To reduce degradation of the Ryton, heating was terminated upon dissolution of all the polymer. The process was performed under a nitrogen atmosphere. Thereafter, the vessel was cooled and the Ryton precipitated and coated the wollastonite particles in a substantially uniform manner throughout the surface thereof. The material was washed with acetone and filtered and the solvent was dried off the material by vacuum drying at 80° C. The drying occurred for about twelve hours. The weight of the material after evaporation was checked against combined weight of wollastonite and Ryton and it was determined that the resultant powder contained about 80% by weight wollastonite.

EXAMPLE 13

Amounts of powder made as in Examples 1, 2, 3, 8, 9, 10 and 11 were placed in molds in a powder metallurgy press. The amount was sufficient to fill the mold. The molds were for a disk of about 1½ cm in diameter and approximately 3 mm in thickness. The powders were compressed giving a large reduction in the powder volume resulting in a part conforming to the mold dimensions. The pressure applied was about 5 tons per square inch. Following the pressing operation, the materials were removed from the respective molds and placed in an oven which was heated to a temperature approximating the crystallization temperature of the Nylon 6, i.e., about 340°-350° F. The articles were maintained in the oven at this temperature for a minimum of fifteen minutes and a maximum of about one half hour. The atmosphere of the oven was inert, i.e., nitrogen, to prevent oxidation and maintain color control of the article. After baking, the parts were cooled and removed for use. The parts were tested for strength and were found to be more resistant to fracturing than articles manufacturing the conventional simultaneous compressing and heating molding processes wherein large amount of resins are used.

EXAMPLE 14

Amounts of powder made as in Examples 4 and 5 were placed in molds in a powder metallurgy press. The amount was sufficient to fill the molds. The mold was for a disk of about 1½ cm in diameter and approximately 3 mm in thickness. The powder was compressed giving a large reduction in the powder volume resulting in parts conforming to the mold dimensions. The pressure applied was about 5 tons per square inch. Following the pressure operation, the material was removed from the molds and placed in an oven which was heated to a temperature approximating the crystallization temperature of the PET. The articles were maintained in the oven at this temperature for a minimum of fifteen minutes and a maximum of about one half hour. The atmosphere of the oven was inert, i.e., nitrogen, to prevent oxidation and maintain color control of the article. After baking, the parts were cooled and removed for use. The parts were tested for strength and was found to be more resistant to fracturing than articles manufactured by the conventional simultaneous compressing and heating molding processes wherein large amounts of resins are used.

EXAMPLE 15

Amounts of powder made as in Examples 6 and 7 were placed in molds in a powder metallurgy press. The amount was sufficient to fill the molds. The mold was for a disk of about 1½ cm in diameter and approximately 3 mm in thickness. The powder was compressed giving a large reduction in the powder volume resulting in parts conforming to the mold dimensions. The pressure applied was about 5 tons per square inch. Following the pressing operation, the material was removed from the mold and placed in an oven which was heated to a temperature approximating the crystallization temperature of the Nylon 11. The articles were maintained in the oven at this temperature for a minimum of fifteen minutes and a maximum of about one half hour. The atmosphere of the oven was inert, i.e., nitrogen, to prevent oxidation and maintain color control of the article. After baking, the parts were cooled and removed for use. The parts were tested for strength and were found to be more resistant to fracturing then articles manufactured by the conventional simultaneous compressing and heating molding processes wherein large amounts of resins are used.

In addition to the above-examples, various articles were manufactured in accordance with the general principles of the examples, and in varying percentages. The results are set forth in the following tables.

TABLE I

| °F. FUSE TEMP | AVE. DIA.-IN. AS PRESSED | AVE. DIA. FUSED | AVE. DIA. SHRINKAGE | AVE. THICK:IN. AS PRESSED | AVE. THICK:IN. FUSED | AVE. THKNSS SHRINK | AVE. LOAD LBS. | AVE. DEFL. IN. |
|---|---|---|---|---|---|---|---|---|
| 70% WOLLASTONITE - 30% NYLON 6 - COMPACTED AT 38 TONS ||||||||||
| 154 | 0.819 | 0.8177 | .0013 | .0902 | .0897 | .0005 | 1.3 | <1/64" |
| 176 | 0.819 | 0.8177 | .0013 | .0904 | .0898 | .0006 | 1.8 | <1/64" |
| 200 | 0.819 | 0.8176 | .0014 | .0899 | .0892 | .0007 | 4.3 | .014 |
| 250 | 0.820 | 0.817 | .0026 | .0908 | .0900 | .0009 | 5.4 | .021 |
| 300 | 0.820 | 0.815 | .0043 | .0902 | .0885 | .0017 | 12.6 | .032 |
| 350 | 0.820 | 0.815 | .0052 | .0902 | .0876 | .0026 | 28.6 | .043 |
| 375 | 0.820 | 0.8134 | .0066 | .0910 | .0871 | .0039 | 26.4 | .037 |
| 400 | 0.820 | 0.8138 | .0063 | .0908 | .0867 | .0041 | 29.2 | .048 |
| 420 | 0.820 | 0.8132 | .0071 | .0908 | .0867 | .0041 | 34.6 | .055 |

As can be seen from this table, as crystallization temperature is approached, strength increases dramatically without corrresponding increase in shrinkage.

TABLE II

| | FRACTURE LOAD-LBS./STRESS-PSI ||||||||
| | *20% NYLON 6 ||| *30% NYLON 6 || *40% NYLON 6 |||
| | 5 TON | 10 TON | 16 TON | 5 TON | 38 TON | 5 TON | 10 TON | 16 TON |
|---|---|---|---|---|---|---|---|---|
| 350° F. | 41½-3900 | 35-4000 | 32-3700 | 30-3300 | 28½-2100 | 26-1800 | 30½-2000 | 29-1900 |
| 300° F. | 32½-3000 | 30-2900 | 27-2900 | 21½-2100 | 12½-1700 | 24-1600 | 25-1600 | 23-1500 |
| 200° F. | 22½-2000 | 17-1800 | 17½-1900 | 5-527 | 4-555 | 1-57 | 1½-96 | 1-63 |
| DENSITY RATIO % | 92.3% | 93.5% | 94.6% | 88.5% | 88% | 82.4% | 82% | 81.9% |
| COMPARISON THK. IN. | 0.106 | 0.100 | 0.097 | 0.101 | 0.091 | 0.125 | 0.128 | 0.129 |

SHRINKAGE
20% NYLON 6
DIA. .002"/1"
THK. .0026"/1"
*BALANCE OF COMPOUND WAS WOLLASTONITE

This table shows that lower pressures can be used without detrimental effects.

TABLE III

| MATERIAL | COMP. FORCE TONS | FILL IN. | DIM DIA. IN. | DIM THK. IN. | DIM. CHG. DIA. IN. | DIM. CHG. THK. IN. | WGT. CHG. GMS. | DENSITY RATIO % COMPACT |
|---|---|---|---|---|---|---|---|---|
| 20% NYLON 6 | 2 | 1 1/32" | .827 .828 | .091 | +.0043 | +.0048 | −.013 | 69.3 |
| 80% FIBERGLASS 1/32" | 5 | " | .827 | .078 | +.0039 | +.0027 | −.019 | 79.5 |
|  | 7 | " | .827 .828 | .072 | +.0035 | +.002 | −.020 | 82.0 |
|  | 10 | " | .827 .828 | .070 | +.0035 | +.0017 | −.019 | 83.3 |
|  | 2 | " | .828 | .088 | +.004 | +.0045 | +.021 | 66.5 |
|  | 5 | " | .827 .828 | .0745 | +.0037 | +.0028 | +.017 | 77.6 |
|  | 7 | " | .827 .828 | .074 | +.0035 | +.0023 | +.003 | 81.6 |
|  | 10 | " | .828 | .067 | +.0035 | +.0017 | −.014 | 84.8 |
| 20% NYLON 6 | 2 | " | .830 .831 | .096 | +.0054 | +.0045 | −.007 | 64.5 |
| 80% FIBERGLASS 1/16" | 5 | " | .828 .829 | .082 | +.0042 | +.0027 | +.006 | 77.8 |
|  | 7 | " | .828 .829 | .078 | +.0038 | +.0023 | −.002 | 81.8 |
|  | 10 | " | .828 .829 | .073 | +.0032 | +.002 | +.001 | 84.4 |
|  | 2 | " | .830 .831 | .094 | +.0061 | +.0045 | −.013 | 64.3 |
|  | 5 | " | .829 | .081 | +.0041 | +.0029 | +.014 | 77.2 |
|  | 7 | " | .828 .829 | .079 | +.0032 | +.0024 | −.003 | 81.5 |
|  | 10 | " | .828 .829 | .074 | +.0032 | +.0017 | −.010 | 84.8 |
|  | 2 | " | .833 .834 | .106 | +.0049 | +.0066 | +.011 | 61.5 |

| MATERIAL | COMP. FORCE TONS | FRACTURE LOAD LBS. | FRACTURE STRENGTH PSI | SINIER DEFL. IN. | SINIER TEMP. °F. | COOL RATE | |
|---|---|---|---|---|---|---|---|
| 20% NYLON 6 | 2 | 7.7 | 846 | .063 | 350° F. 1 hr. | Air Quench | |
| 80% FIBERGLASS 1/32 " | 5 | 8.3 | 1284 | .045 | 350° F. 1 hr. | Air Quench | |
|  | 7 | 7.6 | 1408 | .045 | 350° F. 1 hr. | Air Quench | |
|  | 10 | 7.6 | 1487 | .045 | 350° F. 1 hr. | Air Quench | |
|  | 2 | 7.4 | 876 | .060 | 350° F. per hr. | 100° F. | |
|  | 5 | 8.4 | 1436 | .048 | 350° F. per hr. | 100° F. | |
|  | 7 | 8.4 | 1475 | .024 | 350° F. per hr. | 100° F. | |
|  | 10 | 7.4 | 1575 | .015 | 350° F. per hr. | 100° F. | |
| 20% NYLON 6 | 2 | 5.2 | 519 | .063 | 350° F. per hr. | Air Quench | |
| 80% FIBERGLASS 1/16" | 5 | 7.9 | 1108 | .054 | 350° F. per hr. | Air Quench | |
|  | 7 | 7.4 | 1170 | .051 | 350° F. per hr. | Air Quench | |
|  | 10 | 7.6 | 1369 | .040 | 350° F. per hr. | Air Quench | |
|  | 2 | 4.1 | 426 | .015 | 350° F. per hr. | 100° F. | |
|  | 5 | 7.2 | 1032 | .048 | 350° F. per hr. | | |
|  | 7 | 7.7 | 1189 | .039 | 350° F. per hr. | | |
|  | 10 | 8.4 | 1472 | .042 | 350° F. per hr. | | |
|  | 2 | 4.6 | | .054 | 350° F. per Quench | Air Rate was | Compact 1"/min. |

TABLE IV

| MATERIAL | COMP. FORCE TONS | FILL IN. | DIM DIA. IN. | DIM THK. IN. | DIM. CHG. DIA. IN. | WGT. THK. IN. | DENSITY CHG. GMS. | FRACTURE RATIO % COMPACT | LOAD LBS | STRENGTH PSI | DEFL. IN. |
|---|---|---|---|---|---|---|---|---|---|---|---|
| 30% NYLON 6 | 3 | 31/32" | .829 .830 | .095 | −.005 | −.0003 | −.083 | 69.6 | 22 | 2500 | .083 |
| 70% BONDED MICA | 5 | 1" | " | .100 | −.005 | +.0004 | −.077 | 68.0 | 21 | 2200 | .088 |
|  | 7 | 1" | .829 | .096 | −.004 | −.005 | −.064 | 67.4 | 19 | 2100 | .093 |
| 40% NYLON 6 | 3 | 27/32" | .821 .822 | .099 | −.002 | −.003 | −.122 | 72.3 | 33 | 3700 | .135 |
| 60% FIBER-GLASS | 5 | ⅞" | .822 | .097 | −.002 | −.002 | −.114 | 71.1 | 27 | 3100 | .093 |
|  | 7 | ⅞" | .821 .822 | .099 | −.002 | −.002 | −.124 | 73.1 | 32 | 3500 | .077 |
| 40% NYLON 6 | 3 | 27/32" | " | .094 | +.001 | +.010 | 0 | 75.5 | 23 | 2200 | .093 |
| 60% FIBER-GLASS | 5 | 11/32" | .823 | .104 | +.001 | +.010 | −.060 | 81.9 | 32 | 2500 | .073 |
|  | 7 | 31/32" | .821 .822 | .095 | +.002 | +.009 | −.030 | 82.6 | 28 | 2700 | .093 |

FILL = 10:1/9:1
DIE DIA. = .817"

As set forth in tables III and IV, similar results were reported when fiberglass and mica were employed as the filler material for nylon instead of wollastonite.

Having thus described the invention in full detail, it will be apparent that these details need not be fully adhered to and that various changes and modifications may suggest themselves to one of ordinary skill in the art, all falling within the scope of the invention as defined by the appended claims.

What is claimed:

1. In a method of compressively molding articles comprising the steps of compressing a predetermined amount of a moldable composition comprised of resin and filler material in a mold cavity, with the application of heat and pressure to cure and/or solidify the composition to the shape of the mold cavity, the improvement wherein said composition comprises filler material in the form of individual particles of a powder having a plastic resin precipitated on surfaces of the individual filler material powder particles, with said filler material comprising about 60-98% by weight of the composition, compressing the material in the form of coated individual particles initially at room temperature at a rate sufficient to achieve an adiabatic increase in temperature to above the glass transition temperature (Tg) of the resin, and the rate being less than about 1-2 seconds to achieve maximum pressure, in said mold cavity, sufficient to reduce the composition powder volume resulting in a part conforming to the mold cavity, subsequently heating the part outside the mold to a temperature equal to about the crystallization temperature of the plastic resin for a time sufficient to crystallize the plastic resin, and thereafter allowing the resultant part to cool to result in a compressively molded part having a substantially high proportion of reinforcing filler whereby the amount of plastic resin required to mold said part is substantially reduced, and whereby the time required to mold such articles is reduced due to a reduction in the time required in the mold.

2. A method as in claim 1 wherein said composition comprises an inert filler selected from the group consisting of silica and magnesium oxide, said filler being in the form of discrete particles having nylon resin precipitated on the surfaces of the discrete particles.

3. A method as in claim 1 wherein said composition comprises calcium metasilicate particles coated with Nylon in an amount wherein said calcium metasilicate particles comprises about 85-98% by weight of the composition.

4. A method as in claim 1 wherein said composition comprises mica particles coated with Nylon in an amount wherein said mica comprises about 85-98% by weight of the composition.

5. A method as in claim 1 wherein said composition comprises fiberglass particles coated with Nylon in an amount wherein said fiberglass particles comprise about 85-98% by weight of the composition.

6. A method as in claim 3 wherein said composition is compressed in a mold with a pressure of no more than about 5 tons/in$^2$, and the resultant article is then heated in an oven to the crystallization temperature of the Nylon for a time sufficient to cause crystallization of the Nylon.

7. A method as in claim 4 wherein composition is compressed in a mold with a pressure of no more than about 5 tons/in$^2$, and the resultant article is then heated in an oven to the crystallization temperature of the Nylon for a time sufficient to cause crystallization of the Nylon.

8. A method in claim 5 wherein composition is compressed in a mold with a pressure of no more than about 5 tons/in$^2$, and the resultant article is then heated in an oven to the crystallization temperature of the Nylon for a time sufficient to cause crystallization of the Nylon.

9. A method as in claim 6 wherein said temperature is about 340°-350° F. and the time of heating is about 15-30 minutes, with the heating being conducted in an insert atmosphere of nitrogen.

10. A method as in claim 7 wherein said temperature is about 340°-350° F. and the time of heating is about 15-30 minutes, with the heating being conducted in an inert atmosphere of nitrogen.

11. A method as in claim 8 wherein said temperature is about 340°-350° F. and the time of heating is about 15-30 minutes, with the heating being conducted in an inert atmosphere of nitrogen.

* * * * *